(12) United States Patent
Wang

(10) Patent No.: US 8,936,475 B2
(45) Date of Patent: Jan. 20, 2015

(54) ELECTRICAL DEVICE WITH A CLAMSHELL ELECTRICAL CONNECTOR

(71) Applicant: Ji-Cheng Wang, Kunshan (CN)

(72) Inventor: Ji-Cheng Wang, Kunshan (CN)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 83 days.

(21) Appl. No.: 13/684,183

(22) Filed: Nov. 22, 2012

(65) Prior Publication Data

US 2013/0130524 A1     May 23, 2013

(30) Foreign Application Priority Data

Nov. 23, 2011 (CN) .......................... 2011 2 0469593

(51) Int. Cl.
    *H01R 13/44*      (2006.01)
    *H01R 13/447*     (2006.01)
    *G06F 1/16*        (2006.01)

(52) U.S. Cl.
    CPC ............ *H01R 13/447* (2013.01); *G06F 1/1656* (2013.01); *H01R 2201/06* (2013.01)
    USPC .......................................... 439/131; 439/676

(58) Field of Classification Search
    CPC .. H01R 13/447; H01R 23/005; H01R 23/025; H01R 35/04
    USPC ........................... 439/131, 142, 144, 344, 676
    See application file for complete search history.

(56) References Cited

U.S. PATENT DOCUMENTS

| | | | | |
|---|---|---|---|---|
| 5,603,623 A * | 2/1997 | Nishikawa et al. | ........... | 439/144 |
| 5,679,013 A * | 10/1997 | Matsunaga et al. | ........... | 439/144 |
| 6,155,882 A * | 12/2000 | Wu | ................ | 439/676 |
| 6,409,549 B1 * | 6/2002 | Yeh | ................ | 439/676 |
| 6,791,921 B2 * | 9/2004 | Maeda et al. | ............. | 369/47.28 |
| 7,841,876 B2 * | 11/2010 | Lin et al. | ........................ | 439/144 |
| 7,850,371 B2 * | 12/2010 | Riley et al. | ..................... | 385/77 |
| 7,950,635 B2 * | 5/2011 | Proehl | ............................. | 269/17 |
| 7,950,936 B2 * | 5/2011 | Wang et al. | .................... | 439/144 |
| 8,079,864 B2 * | 12/2011 | Lin et al. | ....................... | 439/344 |
| 8,142,217 B2 * | 3/2012 | Lin et al. | ....................... | 439/344 |
| 8,363,386 B2 * | 1/2013 | Cheng et al. | ................. | 361/600 |

* cited by examiner

*Primary Examiner* — Thanh Tam Le
(74) *Attorney, Agent, or Firm* — Wei Te Chung; Ming Chieh Chang

(57) ABSTRACT

An electrical device includes an upper shell facing a user, a lower shell engaged with the upper shell to commonly define a mounting space, a mother board mounted in the mounting space, a receptacle portion and a rotating cover rotating about the receptacle portion. The upper shell defines a first opening for an insertion of a mating plug. The mother board defines a notch, wherein the receptacle portion is holding conductive terminals therein, the receptacle portion is assembled in the notch of the mother board and between the mother board and the upper shell. Wherein the lower shell defines a second opening, the rotating cover is received in the second opening and a front portion of the rotating cover is actuated in to the first opening of the receptacle portion.

15 Claims, 8 Drawing Sheets

ELECTRICAL DEVICE WITH A CLAMSHELL ELECTRICAL CONNECTOR

BACKGROUND OF THE INVENTION

1. Field of the Invention

The present invention relates to an electrical connector and an electrical device with the same, and more particularly to a clamshell electrical connector.

2. Description of the Related Art

U.S. Pat. No. 5,679,013 issued to Ma et al. on Oct. 21, 1997, discloses an open/close type electrical connector including: a base member having an upper face defining an aperture; a cover member for opening and closing said aperture of said base member; means defining a receiving face, disposed in said base member, for receiving a counter electrical connector having a rectangular parallelepiped shape; at last one terminal member, disposed in said based member, and being elastically in contact with a terminal of the counter electrical connector, said cover member being pivotally supported in end portion of said base member for rotation between an opened position and a closed position, said cover member defining thereby an axis of rotation, said cover member and said receiving face of said base member forming an accommodating space for the counter electrical connector when said cover member is in its opened position, and said cover member and said receiving face sandwiching the counter electrical connector; an engagement mechanism engageable with an engagement portion of the counter electrical connector, thereby preventing the counter electrical connector from slipping out of said base member; and an open position restricting mechanism for restricting an open angel of said cover member with respect to said base member, said cover member defining a back face and said receiving face defining a supporting face which is substantially parallel to said back face of said cover member when said cover member is in its opened position. In the flip-type electrical connector disclosed in the aforementioned U.S. Patent, only one side of said cover member is pivotally connected to said base member by a pivot, and the pivot is used as an axis to open said cover member at an inclined angle in rotary manner for the counter electrical connector inclined inserted in the electrical connector when said cover member is in its opened position. However, it is not convenient to manually close said cover member on said base member when said cover member of the flip-type electrical connector needs to rotated to its closed position.

Therefore, an improved electrical connector is desired to overcome the disadvantages of the related arts.

BRIEF SUMMARY OF THE INVENTION

An object of the present invention is to provide an electrical connector easy to use and an electrical device using the same.

In order to achieve above-mentioned object, an electrical device including an upper shell facing a user, a lower shell engaged with the upper shell to commonly define a mounting space, a mother board mounted in the mounting space, a receptacle portion and a rotating cover rotating about the receptacle portion. The upper shell defines a first opening for an insertion of a mating plug. The mother board defines a notch, wherein the receptacle portion is holding conductive terminals therein, the receptacle portion is assembled in the notch of the mother board and between the mother board and the upper shell. Wherein the lower shell defines a second opening, the rotating cover is received in the second opening and a front portion of the rotating cover is actuated in to the first opening of the receptacle portion Therefore with this arranged, the rotating cover is able to be closed automatically when the electrical connector is unconnected so that it is easy to use.

Other objects, advantages and novel features of the invention will become more apparent from the following detailed description of the present embodiment when taken in conjunction with the accompanying drawings.

DESCRIPTION OF PREFERRED EMBODIMENT OF THE INVENTION

Figure 1:
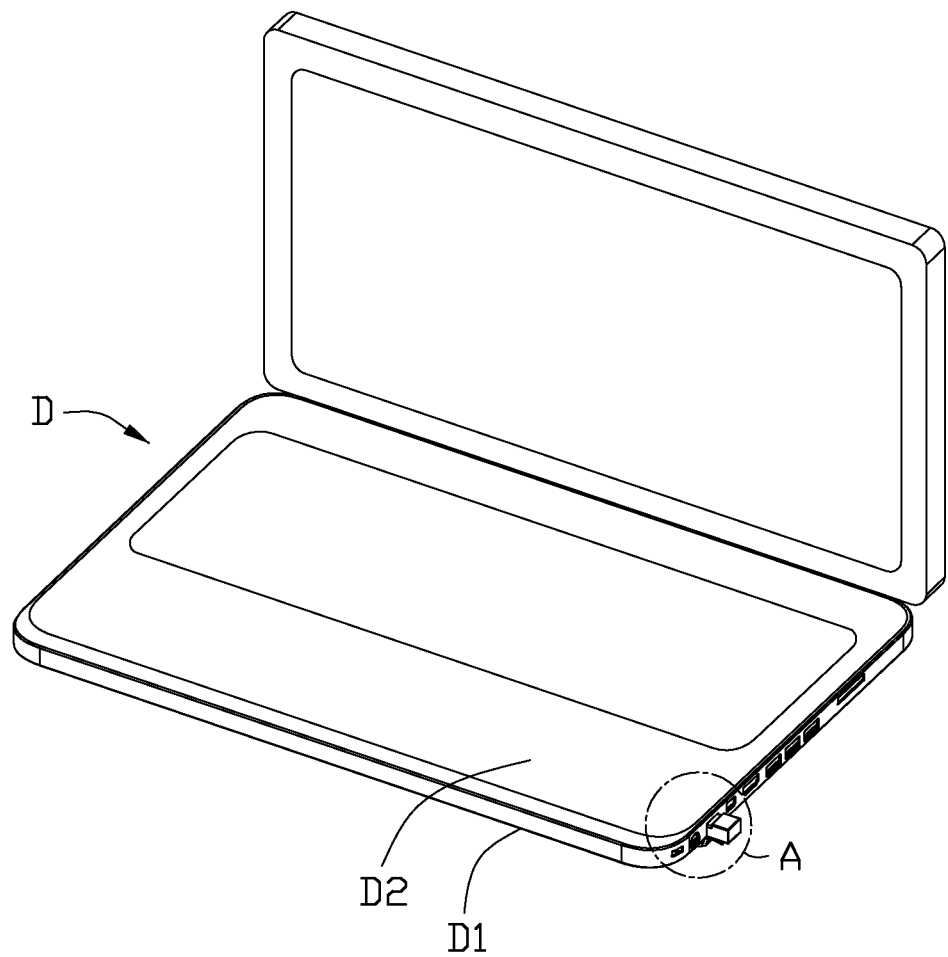
FIG. 1 is a perspective view of an electrical device in accordance with the present invention.
Figure 2:
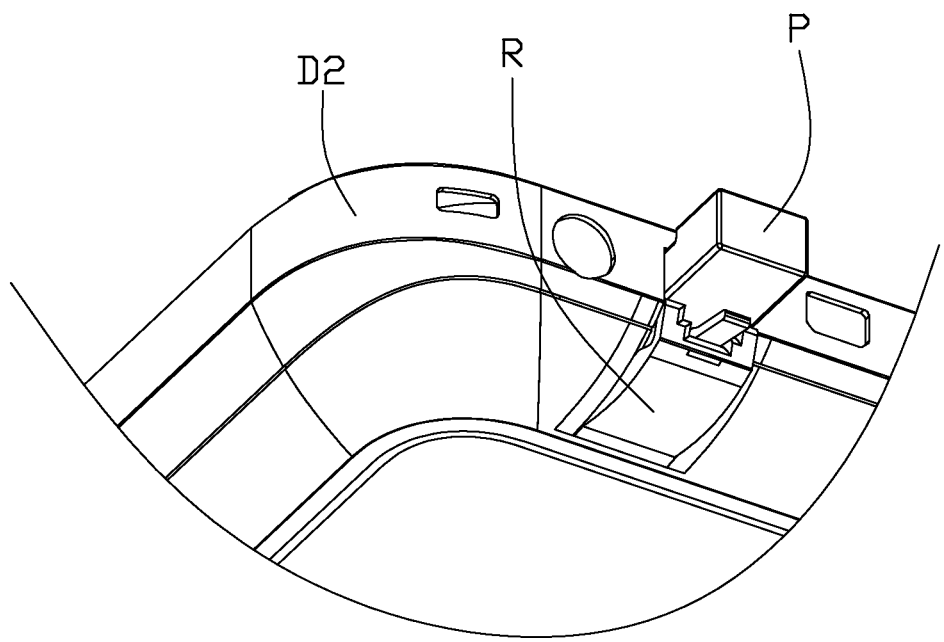
FIG. 2 is an enlarged perspective view of the electrical connector shown in circle A of FIG. 1, wherein an electrical connector in the electrical device is connected with a mating connecting.
Figure 3:
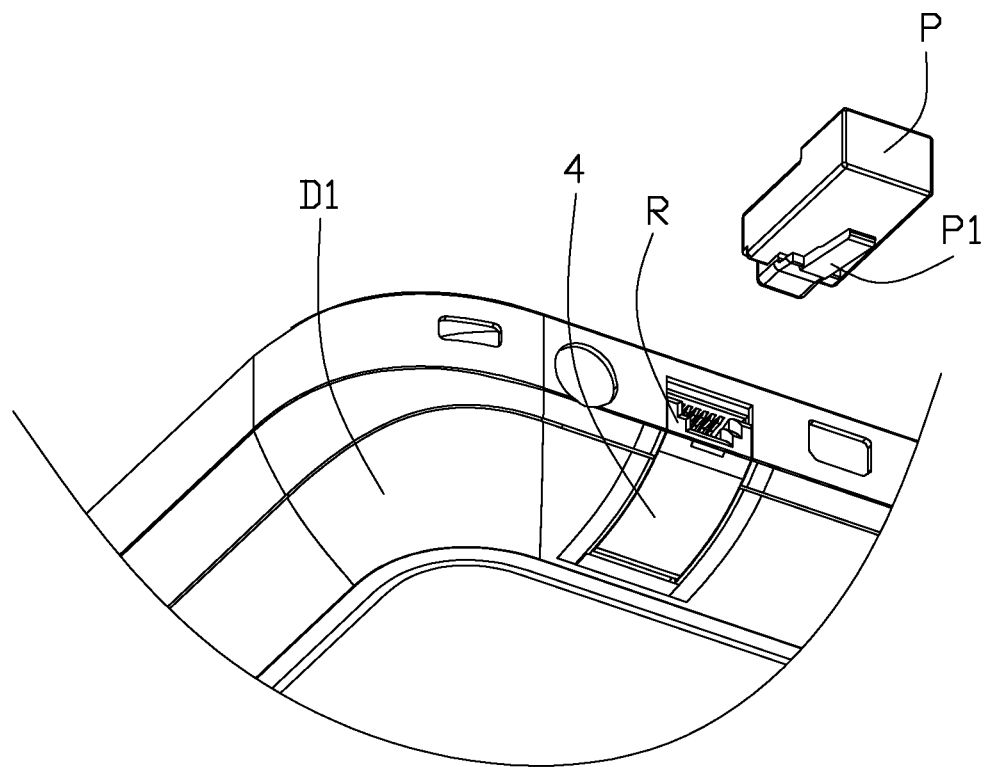
FIG. 3 is an enlarged perspective view similar to FIG. 2, wherein the mating connector is disconnected from the electrical device.

Reference will now be made to the drawing figures to describe a preferred embodiment of the present invention in detail. Referring to FIGS. 1 to 3 illustrate an electrical device D such as Notebook, includes a base system with a mother board 6 (shown in FIG. 6). The base system of the electrical device D comprises a lower shell D1 located at a bottom thereof and an upper shell D2 covering above the lower shell D1, thereby defining a mounting space to receive said mother board 6 and other electrical components (not shown). The base system further defines an electrical connector R or receptacle therein to be inserted with a mating connector P or a cable plug with P. The electrical device will be described hereinwith. In this preferred embodiment combination with FIG. 6, the mother board 6 is mounted in the upper shell D2, the electrical connector R is sunk in the mother board 6 in an upside downward pattern. Alternatively, the invention is not limited in said pattern.

Figure 4:
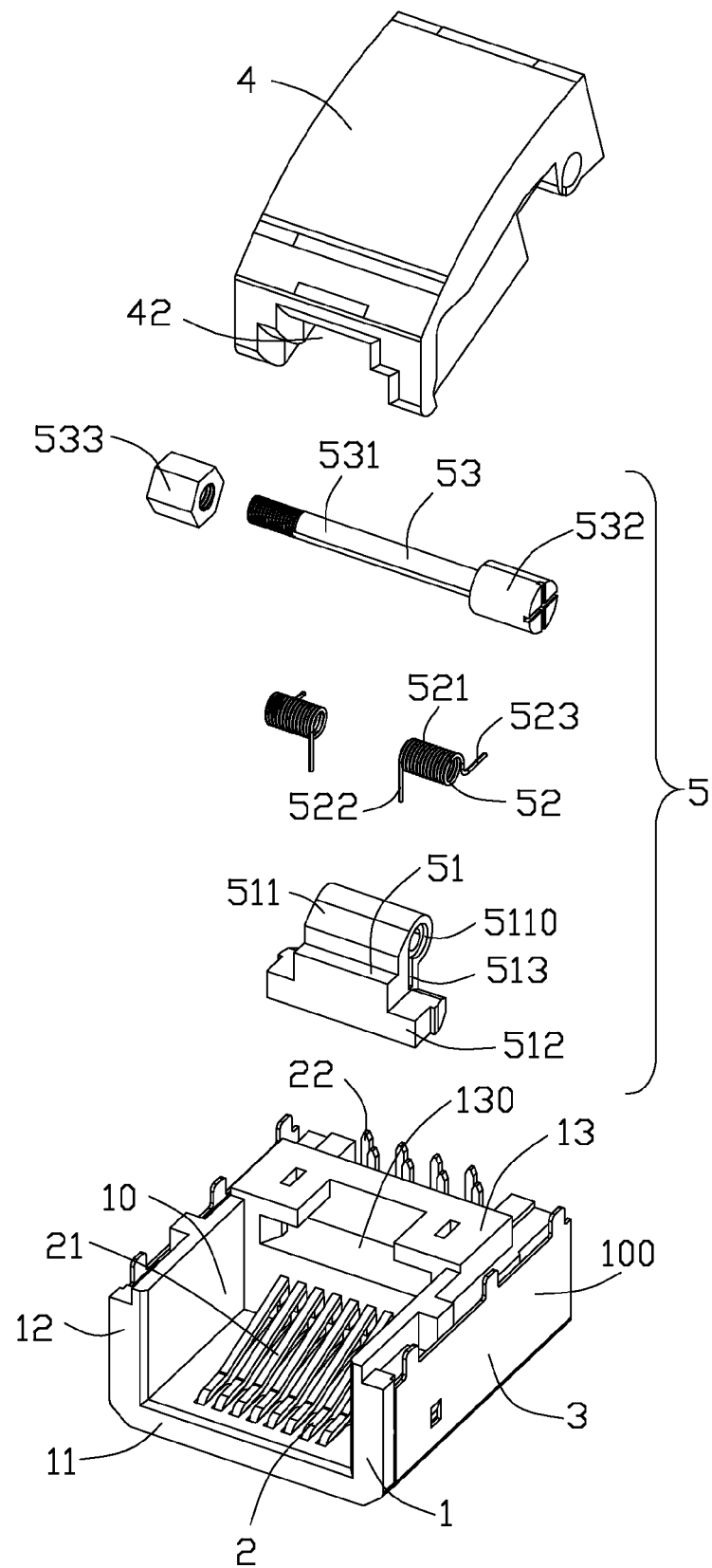
FIG. 4 is an exploded view of the electrical connector.

Referring to FIG. 4, the electrical connector comprises a receptacle portion 100 with a plurality of terminals 2 therein, a rotating cover 4 and a connecting member 5. The receptacle portion 100 includes an insulative housing 1, a metal shell 3 shielding the outside of the insulative housing 1 and the plurality of terminals 2 received in the insulative housing 1. The insulative housing 1 comprises a lower base wall 11, a pair of side walls 12 extending vertically from both sides of the base wall 11 and a rear wall 13 located between the pair of side walls 12 and connecting the base wall 11, said four walls commonly defining a receiving space 10 thereamong. The rear wall 13 defines an inverted-T shaped retained slot 130 in front-to-rear direction, which is configured for communication with the receiving space 10. Each terminal 2 has a contacting portion 21 slanting cross the receiving space 10 from a front of the base wall 11 to a front of the rear wall 13 and a soldering portion 22 extending outside of the rear wall 13 of the insulative housing 1.

Figure 5:
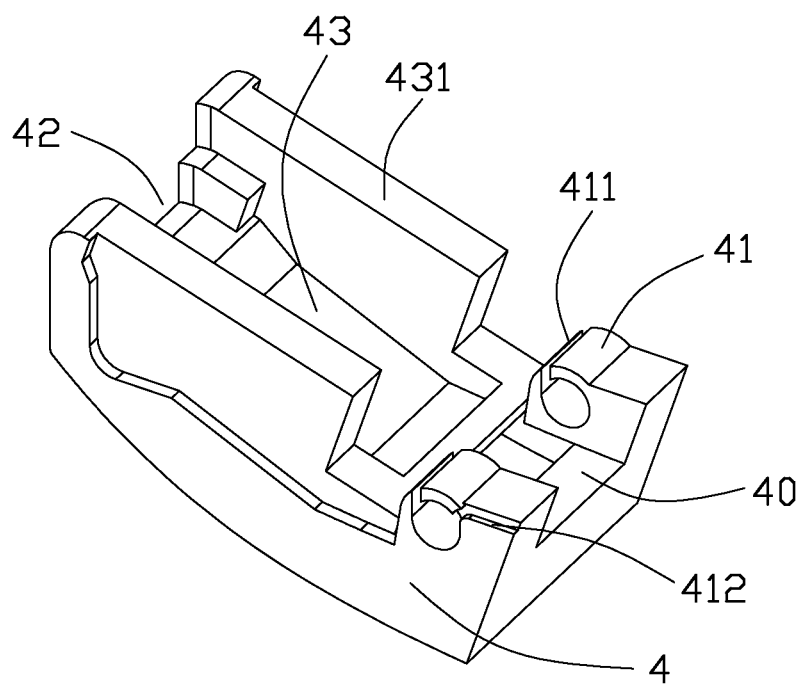
FIG. 5 is a perspective view of a cover of the electrical connector of FIG. 4.

Combination with FIG. 5, the rotating cover 4 defines guiding cavity 43 configured with a pair of side wall 431. The guiding cavity 43 defines a receiving recess 40 which is accommodated with a convex portion 511 of a connecting body 51 at a rear side thereof. A pair of sleeves 41 located on both sides of the receiving recess 40. Each sleeve 41 has a slot 412 at the outside thereof in which the second end 523 of the resilient member 52 is retained and a cutout 411 through which the first end 522 of the resilient member 52 run across into the slit 513. The guiding cavity 43 defines an inserting entrance 42 at a front end thereof which is configured for insertion of the mating connector P engagement with the latch P1 of the mating connector P.

Figure 8:
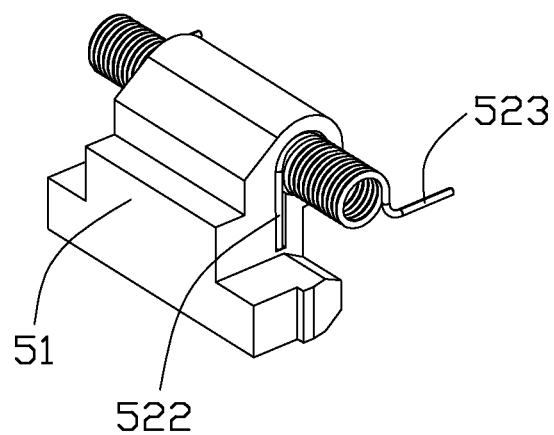
FIG. 8 is a perspective view of the combination of the resilient member and the connecting body of the electrical connector.

The connecting member 5 includes the connecting body 51, the resilient member 52 and a shaft 53. The connecting body 51 defines the convex portion 511 for engaging with the rotating cover 4 and a T-shaped engaging portion 512 blow the convex portion 511. The engaging portion 512 is accommodated and interfered with the retained slot 130. The convex portion 511 has a through-hole 5110 through two opposite ends thereof along a longitudinal direction thereof. The connecting body 51 further defines a pair of slits 513 at both sides of the through-hole 5110. The resilient member 52 is a pair of torsion springs in this embodiment and comprises a cylindrical main portion 521, the first end 522 and the second end 523 extending from both sides of the main portion 521. The shaft 53 includes a rod portion 531, a base end 532 molded integrally with one end of the rod portion 531 and a screw nut 533. The rod portion 531 defines an external thread at the other end opposite to the base end 532 and the screw nut 533 is assembled to the rod portion 531. As best shown in FIG. 8, the first end 522 of the resilient members 52 are retained in the slits 513 of the connecting body 51, the resilient members 52 are disposed at opposite end of the through-hole 5110 and receive in sleeves 41. The rotating cover 4 is assembled to the receptacle portion 100 wherein the convex portion 511 is received in the receiving recess 40 and the second ends of the resilient member 52 is retained in the slots 412 of the rotating cover. Then the shaft 53 goes through the resilient members 52 in the sleeves 41, and the through-hole 5110, the screw nut 533 is screwed to the rod portion 531. The base end 532 and the assembled screw nut 533 are disposed at two opposite ends of the convex portions 511. Therefore, the rotating cover 4 and the receptacle portion 100 is rotatably assembled together.

Figure 6:
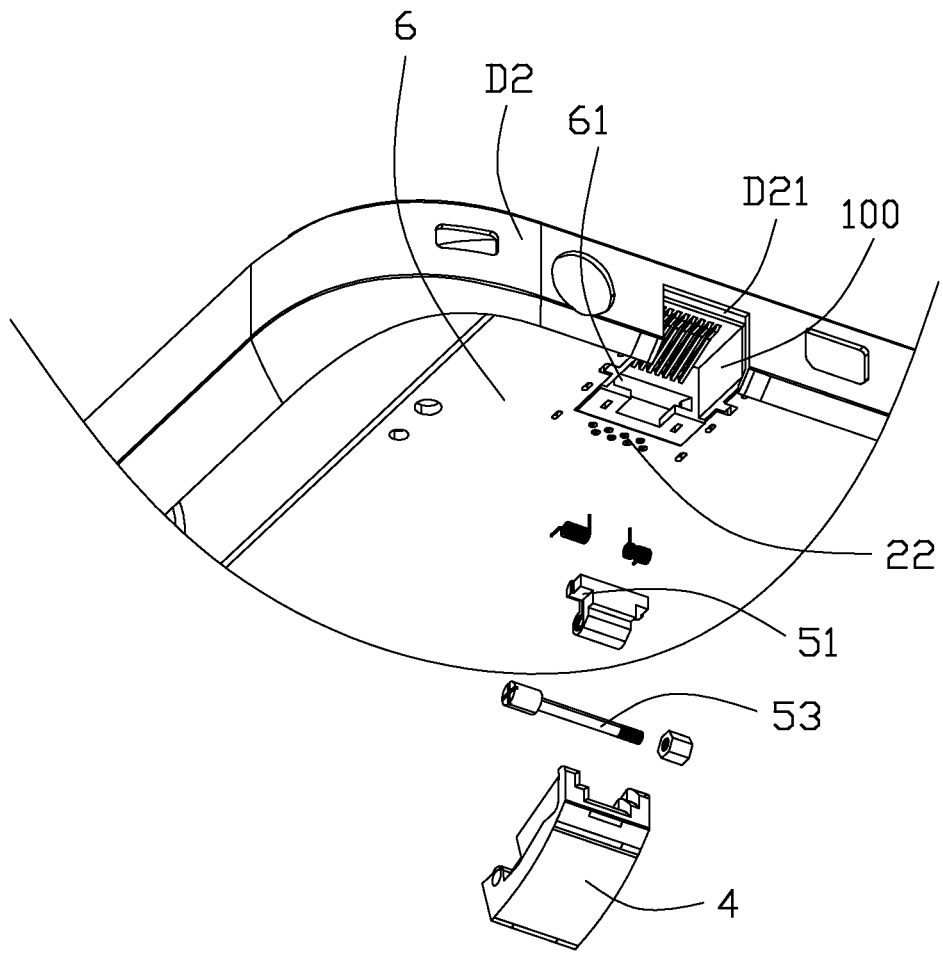
FIG. 6 is a partially exploded view of FIG. 3, wherein a lower shell is not shown.
Figure 7:
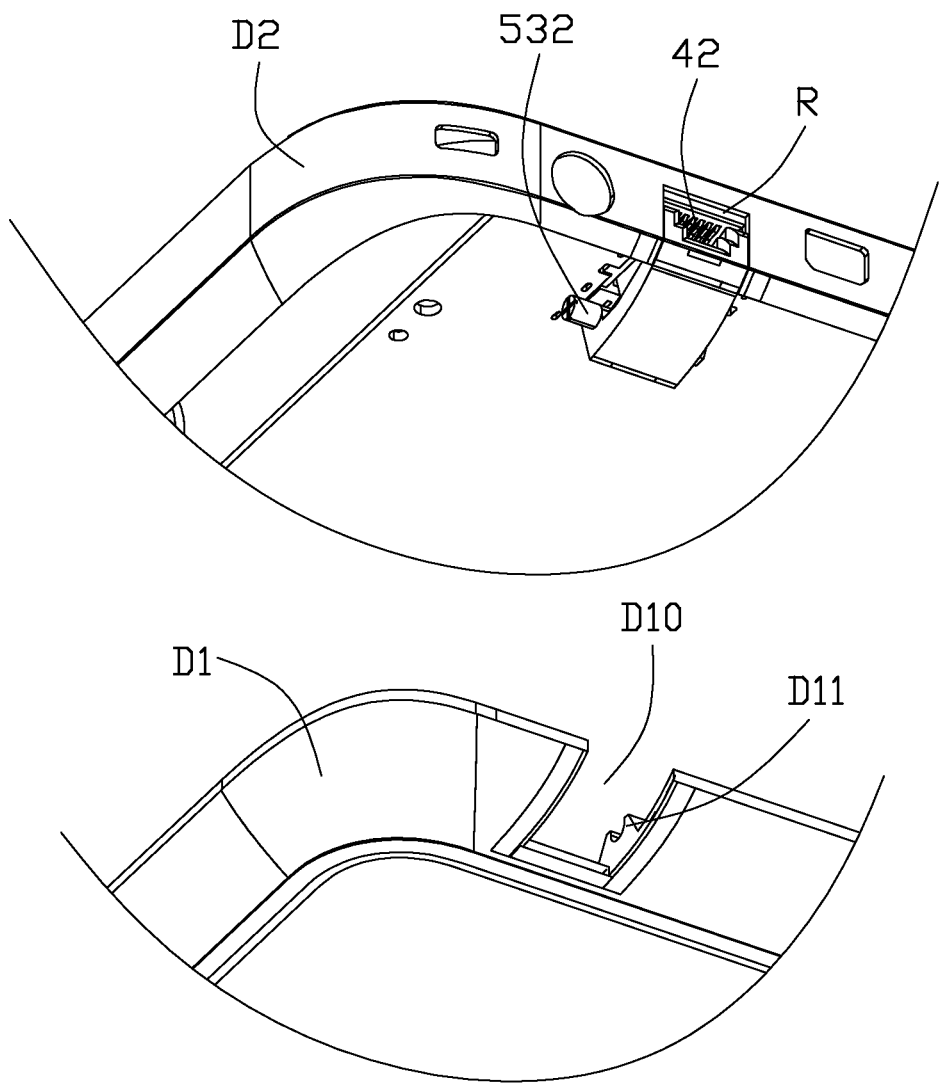
FIG. 7 is a partially exploded view of FIG. 3.

Referring to FIG. 6 and FIG. 7, the upper shell D2 defines a first opening D21, the mother board 6 defines a notch 61 facing the first opening D21. The receptacle portion 100 is mounted in the notch 61 and disposed between the mother board 6 and the upper shell D2, wherein the soldering portions 22 extend to the mother board 6, i.e., the receptacle portion 100 is sunk in the mother board. The rotating cover 4 is collapsed with the receptacle portion 100 into a compact configuration. The lower shell D1 defines an second opening D10 for accommodating the rotating cover 4 wherein a pair of mounting portions D11 located on the both insides of the second opening D10 is provided for supporting the base ends 532 and the screw nuts 533 of the shaft 53.

A step of the electrical connector R assembled to the electrical device D is show as follow. Firstly, the receptacle portion 100 is mounted to the upper side of the mother board 6 located in the mounting space, while the soldering portion 22 of the terminal 2 is welded on the mother board 6 and electrically connected with the mother board 6. Secondly, the connecting body 51 with the resilient member 52 is interposed in the retained slot 130 of the receptacle portion 100, the rotating cover 4 is placed to the receptacle portion 100 and the shaft 53 is assembled the rotating cover 4 and the receptacle portion 100 together. Lastly, the screw nut 533 and base end 532 of the shaft 53 are placed on the mounting portion D11 of the lower shell D1 thereby establishing an engagement of the lower shell D1 and the upper shell D2 of the electrical device D. The rotating cover 4 is located in the second opening D10, the rotating cover 4 and the receptacle portion 100 are located on both sides of the mother board 6 and the rotating cover 4 is actuated by the resilient member 52 into the receptacle portion 100 at a front end of the rotating cover 4, especially the inserting entrance 42 of the rotating cover 4 is located in the mating cavity of the receptacle portion 100.

Referring to FIGS. 2 to 3, when the mating connector P is disconnect from the connector R, the rotating cover 4 is located in the opening D10 in a closed state, the rotating cover 4 is flashed with or within the lower shell D1 to ensure the appearance of the shell of the whole electrical device D. When the mating connector P is inserted to the electrical connector R, the rotating cover 4 is pushed to rotate downward via the opening D10 and drives the deformation of the resilient member 52 at the rear side thereof so that the mating connector P is able to electrically connect to the electrical connector R. The rotating cover 4 is automatically closed under the action of the resilient member 52 when the mating connector P is unplugged. Because of the rotating cover 4 of the electrical connector R is rotated to the lower portion of the electrical device D via the opening D10 of the lower shell D1, the rotating cover 4 is located at the lower portion of the electrical device D so that it is possible to avoid unexpected damage of the electrical device. There is a certain distance between the edge of the electrical device and desktop or other device which is placing the electrical device so that the rotating cover 4 can lift down smoothly. It is easy to use that the rotating cover 4 is automatically closed under the action of the resilient member 52.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the board general meaning of the terms in which the appended claims are expressed.

What is claimed is:
1. An electrical device, comprising:
an upper shell facing a user, the upper shell defining a first opening for an insertion of a mating plug;
a lower shell engaged with the upper shell to commonly define a mounting space;
a mother board mounted in the mounting space and defining a notch; wherein
a receptacle portion holding conductive terminals therein, the receptacle portion being assembled in the notch of the mother board and between the mother board and the upper shell;
a rotating cover rotating about the receptacle portion;
wherein the lower shell defining a second opening, the rotating cover is received in the second opening and a front portion of the rotating cover is actuated in to the first opening of the receptacle portion; and wherein the rotating cover is assembled to the receptacle portion by a connecting member, the connecting member is disposed between the mother board and the lower shell.

2. An electrical connector comprising:

a receptacle portion holding a plurality of conductive terminals therein;

a rotating cover collapsing with insulative housing to define a receiving space communicating with an exterior along a mating direction;

a connecting member comprising a connecting body, a resilient member and a rotation shaft;

wherein a first end of the connecting body is retained in the receptacle portion, a second end of the connecting body is rotatably received in the rotating cover, the rotation shaft go through corresponding holes defined in the rotating cover and the second end of the connecting body respectively, thereby the cover rotating relative to the receptacle portion about said rotation shaft; wherein the housing defines a retaining slot and the connecting body defines an engagement portion received within the retaining slot while the rotation shaft is located outside of said retaining slot;

wherein the rotating cover defines a receiving recess and a pair of sleeves located on both sides of the receiving recess, the connecting body defines a convex portion receiving into the receiving recess and the convex portion has through hole aligned with the sleeves for the shaft going through;

wherein the resilient member is a torsion spring placed on the sleeve; and wherein the retained slot and the engaging portion both are T-shaped.

3. The electrical connector as described in claim 2, wherein the rotating cover defines an inserting entrance communicating with the receiving space.

4. The electrical connector as described in claim 2, wherein the shaft comprises a rod portion running through the sleeves and the through-hole, a base end located on one end of the rod portion and a screw nut assembled to the rod portion.

5. The receptacle connector assembly as claimed in claim 2, wherein the retaining slot communicates with the receiving space along said mating direction, and said engagement portion is assembled into the retaining slot along said mating direction.

6. A receptacle connector assembly for receiving a plug connector, comprising:

a fixed housing unit and a moveable cover rotatable relative to the housing unit about an pivot axis between an inner position and an outer position, said housing unit and said cover commonly defining a mating port for receiving said plug connector when said cover is moved to the outer position, said pivot axis being essentially located at a rear side of the receptacle connector assembly so as to form an insertion opening in a front side of the receptacle connector assembly wherein said opening defines a first dimension when said cover is moved to the outer position, which is larger than a second dimension defined by the opening when said cover is moved to the inner position, a plurality of terminals disposed in the housing unit with resilient contacting sections extending into the mating port; and a resilient member associatively connected to at least one of said housing unit and said cover; wherein said resilient member constantly urges the cover to move back to the inner position once said cover is moved to the outer position;

further including a printed circuit board defining a notch in which said housing unit is received, wherein said pivot axis is locate below said printed circuit board; and said resilient member is converted to a more extended manner when said cover is moved to the outer position, compared with when the cover is moved to the inner position so as to form a restoration force due to said more extended manner for constant urging the cover to move back to the inner position.

7. The receptacle connector assembly as claimed in claim 6, wherein said resilient member is a torsion spring experiencing extension torsion rather compression torsion.

8. The receptacle connector assembly as claimed in claim 6, wherein said housing unit further defines a connecting member through which said pivot axis is defined.

9. The receptacle connector assembly as claimed in claim 8, wherein said resilient member is a spring with one end section abutting against the cover and the other end section abutting against the connecting member.

10. The receptacle connector assembly as claimed in claim 9, wherein said cover is equipped with a latching structure for locking a deflectable latch of the plug connector.

11. The receptacle connector assembly as claimed in claim 8, wherein said connecting member and remaining portions of said housing unit commonly define structure to allow the connecting member to be assembled to said remaining portions in a mating direction of the plug connector relative to the receptacle connector assembly.

12. The receptacle connector assembly as claimed in claim 8, wherein the connecting member further forms a connecting body, and the housing unit further defines a retaining slot to receive an engagement portion of the connecting body therein, wherein the pivot axis is located outside of the retaining slot.

13. The receptacle connector assembly as claimed in claim 6, wherein said housing unit and the cover are commonly enclosed in a periphery region of a case where the cover is compliant with a curved outer surface of the case under condition that the case defines opposite top and bottom main surfaces wherein the housing unit is closer to the top main surface while the cover is closer to the bottom main surface, and said cover does not extend beyond the bottom surface even when the cover is moved to the outer position.

14. The receptacle connector assembly as claimed in claim 13, further including a shaft extending along the pivot axis, wherein the case includes an upper part and a lower part under condition that the lower part defines a bearing area in which said shaft is supported upwardly.

15. The receptacle connector assembly as claimed in claim 13, wherein said pivot axis is essentially located below the terminal in a vertical direction perpendicular to said pivot axis.

* * * * *